(No Model.) 7 Sheets—Sheet 3.

W. B. GORDON.
DISAPPEARING GUN CARRIAGE.

No. 523,570. Patented July 24, 1894.

Witnesses
E. Nottingham
G. F. Downing.

Inventor
W. B. Gordon
By H. A. Seymour
Attorney (No Model.) 7 Sheets—Sheet 7.

W. B. GORDON.
DISAPPEARING GUN CARRIAGE.

No. 523,570. Patented July 24, 1894.

United States Patent Office.

WILLIAM B. GORDON, OF COLD SPRING, NEW YORK, ASSIGNOR OF ONE-HALF TO THOMAS R. MORGAN, SR., OF ALLIANCE, OHIO.

DISAPPEARING GUN-CARRIAGE.

SPECIFICATION forming part of Letters Patent No. 523,570, dated July 24, 1894.

Application filed October 5, 1893. Serial No. 487,204. (No model.)

*To all whom it may concern:*

Be it known that I, WILLIAM B. GORDON, of Cold Spring, in the county of Putnam and State of New York, have invented certain new and useful Improvements in Disappearing Gun-Carriages; and I do hereby declare the following to be a full, clear, and exact description of the invention, such as will enable others skilled in the art to which it appertains to make and use the same.

My invention relates to an improvement in disappearing gun carriages and is designed more particularly as an improvement on the construction disclosed in United States Patent No. 497,977, granted to me May 23, 1893.

The object of my invention is to simplify the construction shown in the patent and the invention consists in the parts and combination of parts as will be more fully described and pointed out in the claims.

In the accompanying drawings,
Fig. 3 is a view in plan.
Fig. 6 is a similar veiw showing the gun in its position after recoil.

A represents a base or bed plate constructed in any desired manner and rigidly fastened to the hydraulic pivot C for traversing. The lower end of this pivot moves in cylinder D and can be elevated by hydraulic pressure, carrying with it the gun carriage and gun thereon. When in this elevated position the carriage rests on the hydraulic pivot thus formed and the traversing can be readily and quickly accomplished. After the carriage has been turned to the desired position the pivot is lowered into the cylinder and the carriage to its bearings on the traverse circle.

The side frames E of the carriage are permanently fastened to the bed plate A. In the construction shown the bed plate and side frames are made in two castings, one half of the bed plate being cast with each side frame.
Each side frame is provided on its upper edge with bearings E' in which are mounted the crank arms. These arms are arranged parallel, two to a side and are connected at their upper ends to shafts G, which pass through the cheek pieces H rigidly braced a suitable distance apart to receive the gun between them, each piece having trunnion bearings for the reception of the trunnions of the gun I. The shafts G pass through the top carriage from side to side and are journaled therein, one in front and one in the rear, and are rigidly fastened at their outer ends to the parallel arms F of the crank arms. These arms are each in effect two cranks, the inner cranks F, which as clearly shown, are located in planes inside the inner faces of the side frames, and support the top carriage, and the outer cranks F' rest on the outside of the side frame and support the counterweight K, which latter counterbalances the weight of the gun. The four parallel crank arms are as before stated journaled in the side frames E of the lower carriage and at their lower ends to the counterweights, it follows that when the upper carriage with the gun thereon is rising the counterweights are descending and vice versa.

In the patent above referred to the counterweights are shown and described as transomed together at their ends so as not to interfere with the movable parts carrying the top carriage. In this construction the counterweights are independent of each other. As the crank arms are connected at their tops to the top carriage they together with the counterweights carried thereby are prevented from moving independently, but to further strengthen and tie the other series of crank arms together, I have connected the front arms on line of front crank bearings by a through shaft $F^2$ which as will be readily seen operates to tie the counterweights together and prevent their independent movement. This allows of the omission of front and rear transoms connecting counterweights and also permits of the shortening of the latter. This is important in reducing the length of the whole carriage to less than the length of the gun, thus giving the greatest practical economy of space in the battery.

From the foregoing it will be seen that the carriage as thus far described consists of a bed plate mounted on a hydraulic pivot for traversing and carrying a main carriage or side frames, parallel crank arms journaled in said side frame, counterweights each carried by two arms, and a top carriage carried by the four arms, so that as the gun and top carriage move rearwardly and downwardly from the effect of the recoil, the counterweights move forwardly and upwardly until they come to a rest. When in this latter position the gun is in its lowest position, or in its position for loading, and the counterweights are in their elevated position, and hence in a position to raise the gun or assist in raising it to its firing position.

The gun is mounted on the top carriage and moves with it in recoil without change of elevation, the top carriage being provided with an elevating device $m$ which is independent of any other part of the carriage.

The device for taking up the recoil consists of a hydro-pneumatic cylinder U secured to the bed plate A and provided with a piston and piston rod, the front or outer end of the latter engaging and secured to a cross head N carried by the rack bars N'. These rack bars are located near the side frames and are preferably mounted on wheel $N^2$ journaled in bearings carried by the bed plate. The bars are preferably flanged as shown so as to overlap the wheels $N^2$, but if desired the wheel might be grooved to receive the bars, or the bars might run in stationary ways. These details are immaterial as any devices for guiding the bars and preventing lateral displacement of same will answer all purposes. The rack bars are engaged by the toothed idlers O journaled on or secured to a shaft O' mounted in the side frames, and the idlers O are in turn engaged by the toothed wheels or segments P secured to the rear crank arms and concentric with the axis of said arms.

Figure 1:
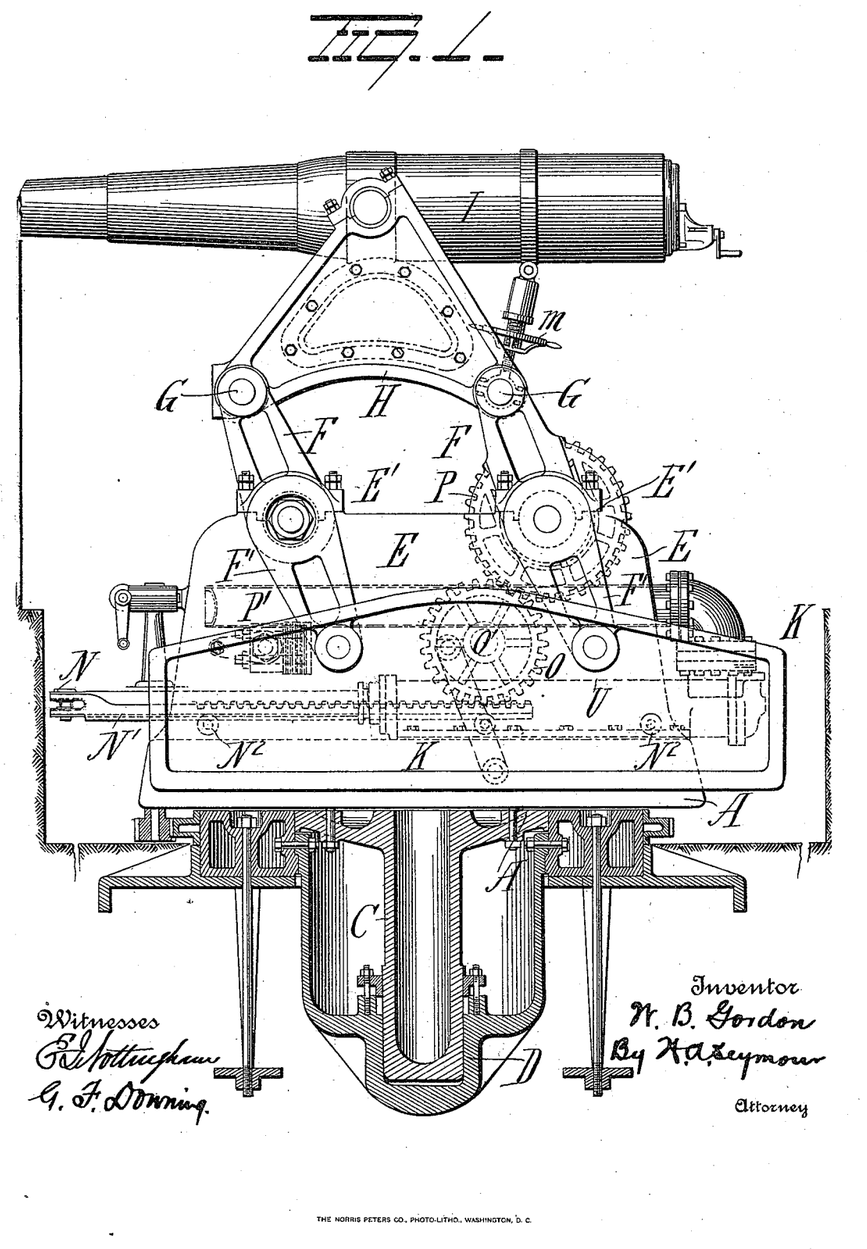
Figure 1 is a view in side elevation of a carriage embodying my invention.
Figure 2:
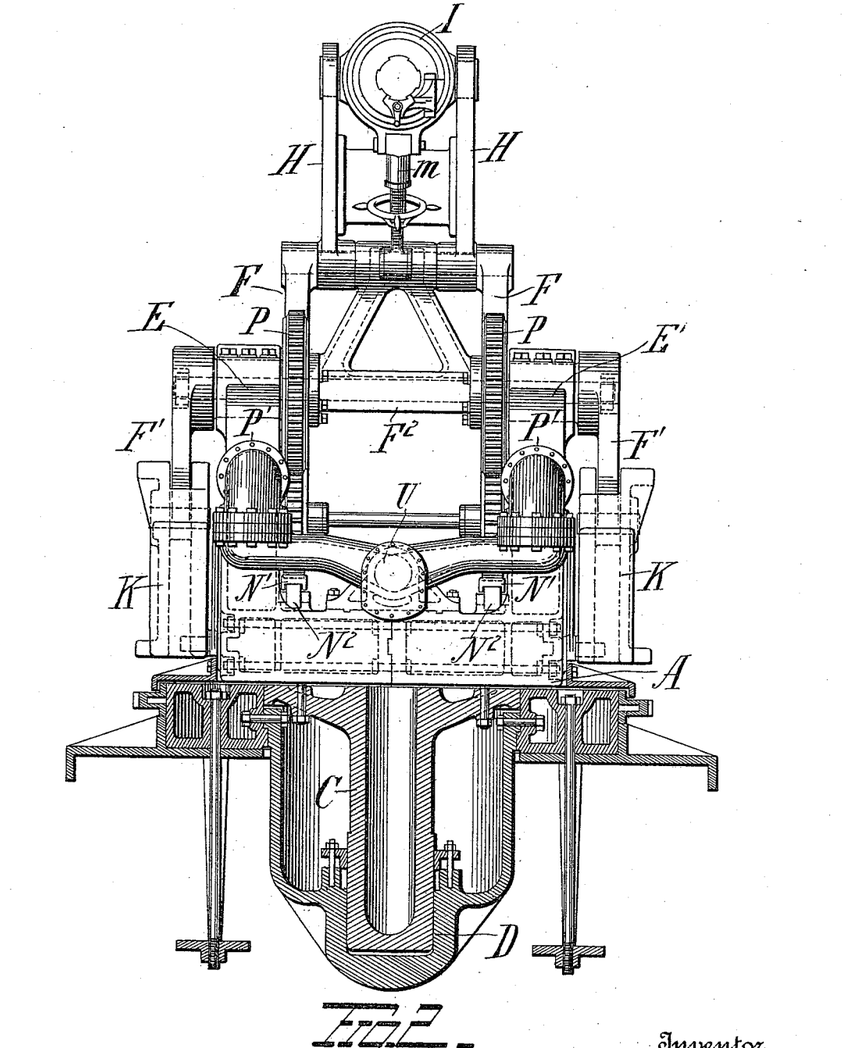
Fig. 2 is a view in end elevation thereof.
Figure 4:
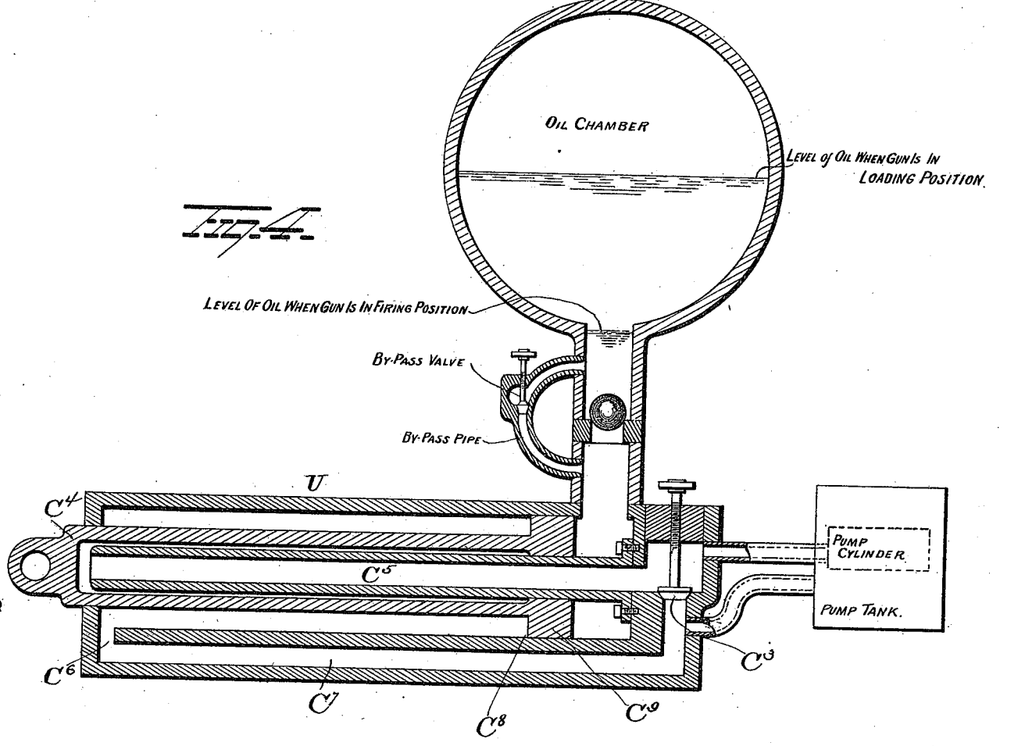
Fig. 4 is a diagrammatic view in section through the cylinder and reservoir showing a ball valve and by-pass pipe.
Figure 5:
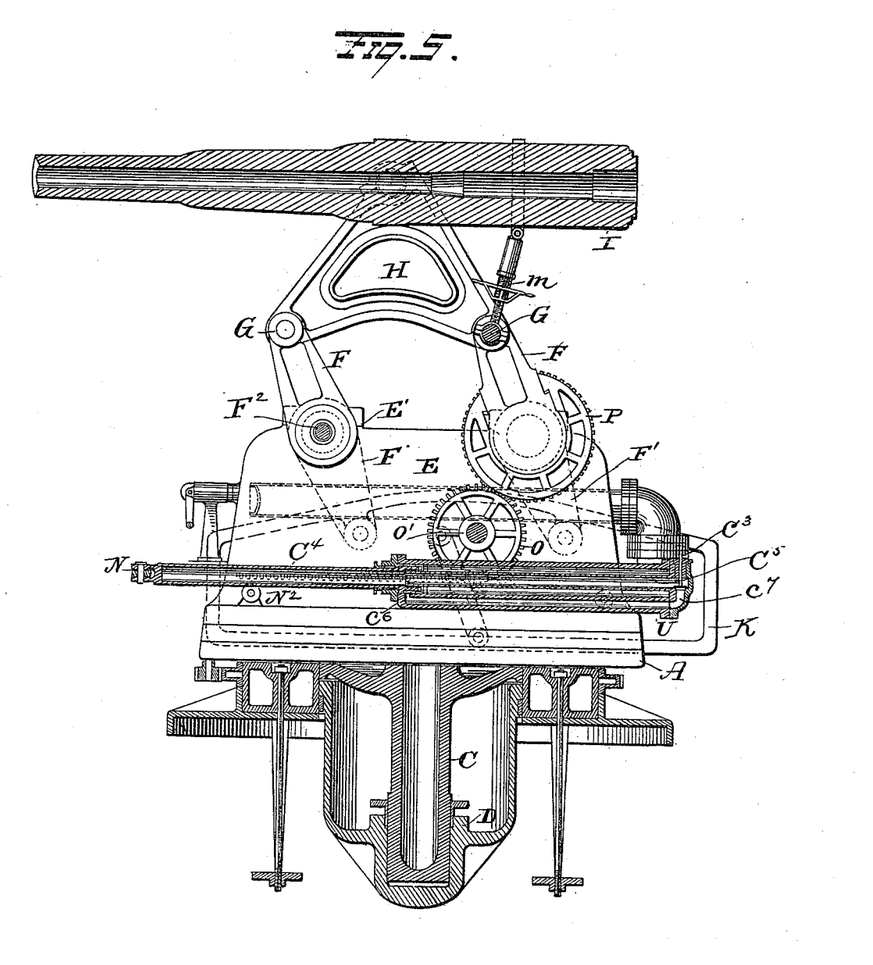
Fig. 5 is a view in section showing the gun elevated.
Figure 6:
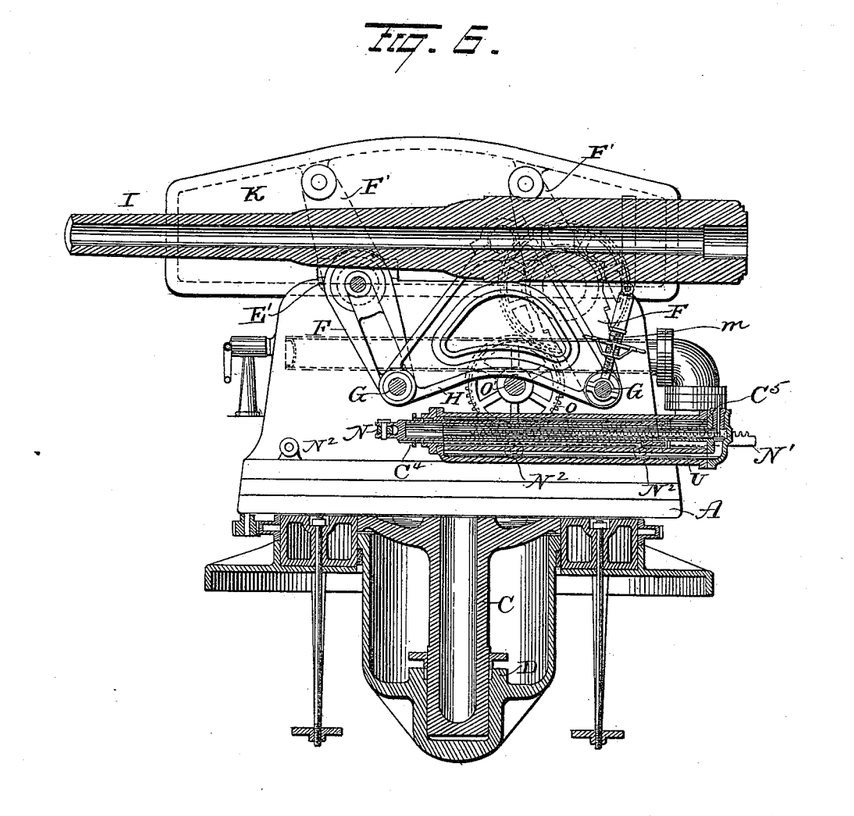
Figure 7:
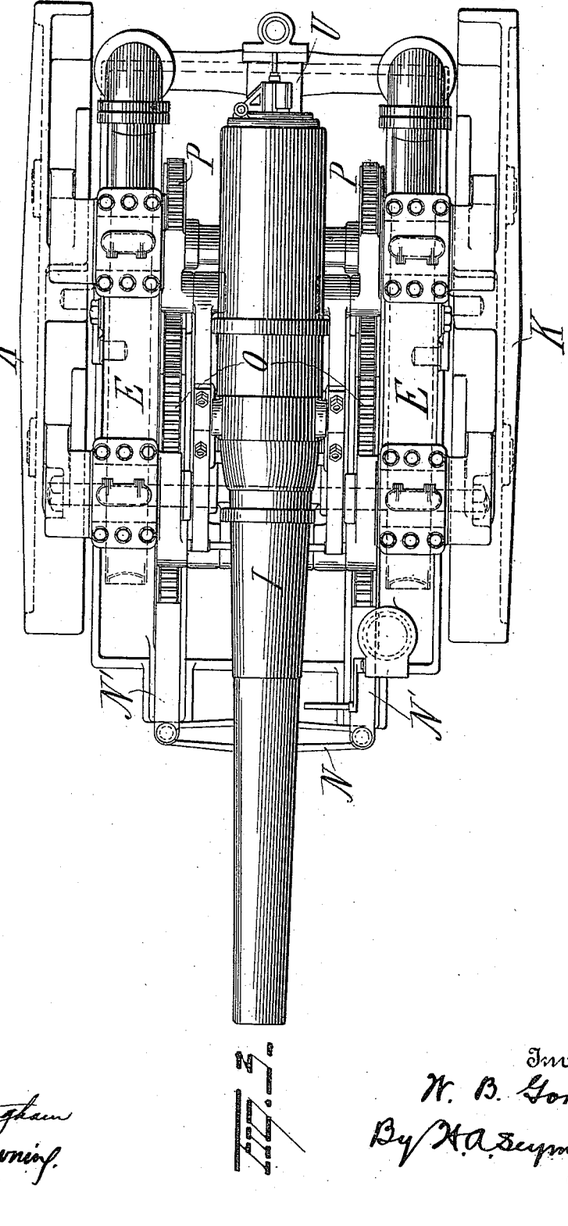
Fig. 7 is a view in section through the cylinder and reservoirs.

Located within the side frames or housings, or formed directly in said frames or housings are the air reservoirs P' shown clearly in dotted lines in Fig. 1. By placing the reservoirs in side frames or housings, I not only economize space, and protect the cylinders, but I am also enabled to employ larger air reservoirs, which makes the pressure vary less from beginning to end of stroke of piston. These reservoirs are connected as shown in Figs. 2 and 7, to the rear end of the cylinder U, valves being interposed as in Patent No. 497,977, to permit of the passage of the fluid from the cylinder to the reservoirs when the piston is moving inwardly, and to retain fluid under pressure therein, the fluid being released from the reservoirs by a by-pass leading from the reservoirs to the cylinders. The cylinder U shown in Figs. 4 and 7 is connected at $d$ with passages leading to the air reservoirs through the check valves. The piston rod $C^4$ which works in the cylinder U is also a cylinder. Another cylinder $C^5$ which is rigidly fastened to the rear head of the cylinder U works in the cylinder. A valve $c^3$ opens or closes a passage $c^7$ leading from the cylinder $C^5$ to the front end of the cylinder U at $c^6$.

To raise the gun to the firing position it is simply necessary to close the valve $c^3$ and pump liquid into the cylinder $C^5$, thus forcing the piston rod $C^4$ out of the cylinder, and by means of the racks and gears before described lifting the gun and lowering the counterweights.

To lower the gun to the loading position, the valve $c^3$ is opened and liquid pumped into the cylinder $C^5$ as before. The liquid pressure is then on the interior of the cylinder $C^4$ as before, but also on the face $c^8$ of the piston head $c^9$. The area of this face is greater than the interior cross section of the cylinder $C^4$ and therefore the tendency of the liquid pressure is to force the piston rod $C^4$ into the cylinder U and thus lower the gun and raise the counterweights. When firing the recoil of the gun forces the piston $C^4$ into the cylinder, and the liquid in front of the piston head $c^9$ is thus driven through the check valves into the air reservoirs. At the same time the liquid in the cylinder of piston $C^4$ is driven through the open valve $c^3$ and passage $c^7$ into the cylinder behind the head $c^9$. It is readily seen from this operation that the energy of recoil is stored in the air reservoirs, and by opening a by-pass around the check valves, this energy is available for lifting the gun to the loading position as in Patent No. 497,977 as above referred to.

In Fig. 1, I have shown the gun in its firing position and the cross head N in a position slightly in advance of the top carriage. As the charge is fired the gun begins to move rearwardly and downwardly and necessarily elevating the counterweights. As the top carriage begins to descend, the rack bars move the piston rod rearwardly and consequently force the fluid contained in the cylinder into the air chambers and by the time the piston has reached the end of the stroke the gun and counterweights have moved to the loading position. During the recoil, the system rotates about the journals of the parallel cranks, the loading position being as nearly as may be, directly under the firing position, thus securing the maximum amount of cover.

If desired the counterweights and the outer sections of the double crank arms may be omitted and replaced in effect by increasing the air pressure in the recoil cylinder. If desired two or more cylinders may be employed. With the counterweights omitted the fluid under pressure would raise or assist in raising the gun to its firing position, would sustain it in its elevated position, and would also oppose the rearward motion of the gun during recoil, in exactly the same way as above described for the design with counterweights, the only difference being that the cylinders would have to do an additional amount of work equivalent to the lifting of the counterweights.

The principal points of difference between this structure and the structure disclosed in my Patent No. 497,977 are in the omission of connecting rods from top carriage to piston rods; omission of all maneuvering gear from the sides and counterweights, and in placing the reservoir in side housing or in forming the reservoirs directly in said housings.

With this structure as with the other I employ an air pump for forcing air into the reservoirs, and a pump or pumps for the liquid. I would also have it understood that I do not confine myself to the details herein shown and described but consider myself at liberty to make such changes and alterations as fairly fall within the spirit and scope of my invention.

Having fully described my invention, what I claim as new, and desire to secure by Letters Patent, is—

1. The combination with two pairs of pivoted arms and a top carriage for a gun, the said carriage supported upon the upper ends of said pivoted arms, of a cylinder containing a resistance medium and gearing connecting one or more of the pivoted arms with the piston of said cylinder, substantially as set forth.

2. The combination with two pairs of pivoted arms and a top carriage for a gun, the said carriage supported upon the upper ends of said pivoted arms, of a cylinder containing a resistance medium, a rack bar connected to the piston rod of said cylinder and gearing connecting said rack bar and one or more of the pivoted arms, substantially as set forth.

3. The combination with two pairs of pivoted arms, and a top carriage mounted on the upper ends of said arms, of a cylinder containing a resistance medium, a piston therein, rack bars connected to said piston, and gearing connecting said rack bars with one pair of pivoted arms, substantially as set forth.

4. The combination with two pairs of pivoted arms and a top carriage mounted on the upper ends of said arms, of a cylinder containing a resistance medium, a piston and piston rod, rack bars connected to said piston rod, toothed wheels or segments attached to and concentric with the axis of one pair of pivoted arms, and idlers meshing with said wheels or segments and with the teeth on the rack bars.

5. The combination with two pairs of pivoted arms, a top carriage for a gun, the said carriage supported upon the upper ends of said pivoted arms, and counterweights carried by the opposite ends of said arms, of a cylinder containing a resistance medium, and gearing connecting one or more of the pivoted arms with the piston of said cylinder, substantially as set forth.

6. The combination with two pairs of pivoted arms, a top carriage for a gun, the said carriage supported upon the upper ends of said pivoted arms, and counterweights carried by the opposite ends of said arms, of a cylinder containing a resistance medium, a rack bar connected to the piston rod of said cylinder and gearing connecting said rack bar and one or more of the pivoted arms, substantially as set forth.

7. The combination with two pairs of pivoted arms a top carriage mounted on the upper ends of said arms and counterweights carried by the opposite ends of said arms, of a cylinder containing a resistance medium, a piston therein, rack bars connected to said piston and gearing connecting said rack bars with one pair of pivoted arms, substantially as set forth.

8. The combination with two pairs of pivoted arms, a top carriage mounted on the upper ends of said arms and counterweights carried by the opposite ends of said arms, of a cylinder containing a resistance medium, a piston and piston rod, rack bars connected to said piston rod, toothed wheels or segments attached to and concentric with the axis of one pair of pivoted arms, and idlers meshing with said wheels or segments and with the teeth on the rack bars, substantially as set forth.

9. The combination with two pairs of pivoted arms, a top carriage for a gun and gun elevating devices carried by said top carriage, of a hydropneumatic cylinder containing a resistance medium and gearing connecting one pair of said pivoted arms with the piston of said cylinder, substantially as set forth.

10. The combination with side housing, a reservoir therein, and pivoted arms mounted thereon, of a top carriage mounted on the upper ends of said pivoted arms, a cylinder containing a resistance medium and communicating with the reservoir, and gearing connecting one or more of the pivoted arms with the piston of said cylinder, substantially as set forth.

11. The combination with side frames or housings each having an air reservoir therein, and pivoted arms mounted on said frames or housings, of a top carriage carried by said arms, a cylinder communicating with said air reservoirs, piston and piston rod and means connecting the piston rod and one pair of pivoted arms, substantially as set forth.

12. The combination with side frames or housings having compartments therein for storing air under pressure, a cylinder communicating with said compartments and a piston and piston rod, of arms pivoted to said housings, a top carriage carried by said arms, and means connecting said piston rod and one pair of pivoted arms substantially as set forth.

13. The combination with two pairs of pivoted arms, and a top carriage for a gun, the said carriage supported by said arms, of a through shaft on line with the axes of the front pair of pivoted arms and connecting said arms, a cylinder containing a resistance medium, a piston and a piston rod and means connecting said piston rod and one pair of pivoted arms, substantially as set forth.

14. The combination with pivoted arms, and a top carriage supported by said arms, of a cylinder having an inner tube open at one end and opened or closed by a valve at the other end, and a port leading from the rear to near the front end of said cylinder the said port connecting the rear end of the inner tube with the cylinder proper, a piston and a piston rod surrounding the inner tube and means connecting said piston rod with one pair of pivoted arms, substantially as set forth.

In testimony whereof I have signed this specification in the presence of two subscribing witnesses.

WILLIAM B. GORDON.

Witnesses:
D. W. HARKNESS,
W. A. LA DUC, Jr.